(12) United States Patent
Kemp et al.

(10) Patent No.: US 6,253,815 B1
(45) Date of Patent: Jul. 3, 2001

(54) DESIGN PATTERN FOR A TIRE

(75) Inventors: Preston Butler Kemp, Greenville; Todd Stanton Ramsey, Greer, both of SC (US)

(73) Assignee: Michelin Recherche et Techniques S.A. (CH)

( * ) Notice: Subject to any disclaimer, the term of this patent is extended or adjusted under 35 U.S.C. 154(b) by 0 days.

(21) Appl. No.: 09/134,144

(22) Filed: Aug. 14, 1998

(51) Int. Cl.$^7$ ................ B60C 11/13; B60C 13/02
(52) U.S. Cl. ............. 152/523; 152/209.19; 152/DIG. 1
(58) Field of Search .............. 152/209.19, DIG. 1, 152/209.16, 209.15, 523, 524; D12/152, 136, 140

(56) References Cited

U.S. PATENT DOCUMENTS

| | | |
|---|---|---|
| 4,198,774 | 4/1980 | Roberts et al. . |
| 4,625,101 | 11/1986 | Hinks et al. . |
| 4,655,546 | 4/1987 | Nagasaka et al. . |
| 4,823,856 | 4/1989 | Roberts . |
| 5,263,525 | 11/1993 | Yamashita . |
| 5,303,758 | 4/1994 | Clementz et al. . |
| 5,645,660 | 7/1997 | Attinello et al. . |
| 5,645,661 | 7/1997 | Clementz et al. . |

FOREIGN PATENT DOCUMENTS

| | | |
|---|---|---|
| 91 02 607 U | 6/1991 | (DE) . |
| 0 611 668 A1 | 8/1994 | (EP) . |
| 2 412 426 | 7/1979 | (FR) . |
| 2 557 512 | 7/1985 | (FR) . |

*Primary Examiner*—Adrienne C. Johnstone
(74) *Attorney, Agent, or Firm*—Martin Farrell; Alan A. Csontos

(57) ABSTRACT

An opaque article having a surface and substantially asymmetric striae extending along the surface. A portion of the striae reside in a first area and have an orientation. Another portion of the striae reside in a second area and have an orientation substantially opposite the striae in the first area. The first area striae and the second area striae create an optical contrast therebetween at a wide range of viewing angles and illumination angles. The opaque article can be a tire. The striae can reside at numerous locations on the tire, including, for example, the sidewall, tread ribs or blocks, and stone ejectors.

23 Claims, 13 Drawing Sheets

DESIGN PATTERN FOR A TIRE

BACKGROUND OF THE INVENTION

The present invention relates generally to an opaque article and the method of making the opaque article. Specifically, the present invention relates to design patterns on opaque articles such as tires.

Tires typically include indicia on the sidewalls. Indicia can include, for example, letters, numbers, symbols, designs etc. The indicia help identify the manufacturer of the tire. Often, the indicia is difficult to discern on the black background of the tire sidewall. Tire manufacturers have endeavored to increase the visibility of the indicia on the sidewall of tires using numerous techniques.

One method of increasing the visibility of the indicia on the tire sidewall involves raising at least a portion of the indicia from the rest of the sidewall. U.S. Pat. No. 5,263,525 demonstrates this method. The patent discloses the outline of the indicia as being raised from the tire sidewall.

Another method of increasing the visibility of the indicia on the tire sidewall involves the use of colored indicia. Colored indicia set on a black tire background certainly increase the visibility of the indicia. The use of colored indicia, however, can complicate the manufacturing process. In addition, tires with colored indicia tend to require increased maintenance from the tire owner as compared to tires without colored indicia.

Another method of increasing the visibility of the indicia on the tire sidewall involves using serrations, or striae. The serrations change the amount of light reflected or deflected from the tire sidewall. The variation in light reflection or deflection enhances the visibility of the indicia. Several patents typify this method. U.S. Pat. No. 4,823,856 discloses the use of serrations on a flat portion of the tire sidewall to define the outline of the indicia. U.S. Pat. No. 5,303,758 discloses the use of two sets of serrations angled with respect to one another. The first set of serrations defines the decorative band around the tire sidewall. The second set of serrations, superimposed over the first set of serrations, forms the indicia.

The aforementioned methods of increasing visibility, while suitable in many instances, still do not provide a strong contrast to the indicia through a wide range of illumination and viewing angles. Clearly, there is room for improvement in the art.

SUMMARY OF THE INVENTION

Therefore, it is an object of the present invention to provide an opaque article having clearly visible indicia thereon.

It is a further object of the present invention to provide an opaque article having indicia thereon that is in strong contrast to the background.

It is a further object of the present invention to provide an opaque article having indicia thereon clearly visible through a wide range of illumination angles.

It is a further object of the present invention to provide an opaque article having indicia thereon clearly visible through a wide range of viewing angles.

It is a further object of the present invention to provide a tire having clearly visible indicia thereon.

It is a further object of the present invention to provide a tire sidewall having clearly visible indicia thereon.

These and other objects are achieved in one aspect of the present invention by an opaque article having a surface and substantially asymmetric striae extending along the surface. A portion of the striae reside in a first area, while another portion of the striae reside in a second area. The striae in the first area have an orientation. The striae in the second area have an orientation substantially opposite the striae in the first area. The first area striae and the second area striae create an optical contrast therebetween at a wide range of viewing angles and illumination angles.

These and other objects are achieved in a second aspect of the present invention by a tire, comprising: a pair of annular beads, each disposed on a respective side of a midcircumferential plane; a carcass ply having a middle portion flanked by ends, each of the ends anchored to one of the bead members; a belt ply positioned radially outward of the middle portion of the carcass ply; a tread portion positioned radially outward of the belt ply; a pair of sidewalls flanking the tread portion and extending towards the bead members and outward of the carcass ply; a surface; and a substantially asymmetric striae extending along the surface. A portion of the striae reside in a first area and have an orientation. Another portion of the striae reside in a second area and have an orientation substantially opposite the striae in the first area. The first area striae and the second area striae create an optical contrast therebetween at a wide range of viewing angles and illumination angles.

These and other objects are achieved in a third aspect of the present invention by a sidewall of a tire, comprising: an annular surface; and a design on the annular surface. The design comprises: a first portion having substantially asymmetric striae extending therealong, the striae having an orientation; and a second portion having substantially asymmetric striae extending therealong, the striae having an orientation substantially opposite the striae in the first portion. The first portion and the second portion of the design create an optical contrast therebetween at a wide range of viewing angles and illumination angles.

BRIEF DESCRIPTION OF THE DRAWINGS

The features of the present invention will become apparent to those skilled in the art to which the present invention relates from reading the following specification with reference to the accompanying drawings in which.

DETAILED DESCRIPTION OF THE PREFERRED EMBODIMENTS

The present invention is directed to indicia for opaque material. The preferred utilization of the present invention is on tires. However, the present invention can be used on any type of opaque article where the visibility of the indicia thereon is a concern.

This application uses numerous phrases and terms of art. The phrase "mid-circumferential plane" refers to the plane passing through the center of the tread and being perpendicular to the axis of rotation of the tire.

The term "radial" refers to the direction perpendicular to the axis of rotation of the tire.

The term "axial" refers to the direction parallel to the axis of rotation of the tire.

The term "lateral" refers to the direction along the tread of the tire going from one sidewall of the tire to the other sidewall.

The term "groove" refers to an elongated void area in the tread that may extend circumferentially or laterally in a straight, curved of zig-zag manner.

The phrase "angle of incidence" refers to the angle at which the light beam arrives at a surface, measured from a line normal to the surface.

The phrase "angle of reflection" refers to the angle having the same value as the angle of incidence, but opposite in sign when measured relative to the line normal to the surface.

The word "reflection" refers to the situation where it appears to an observer substantially aligned with the angle of reflection that the surface does not absorb the light. In other words, the surface appears relatively bright.

The word "deflection" refers to the situation where it appears to an observer positioned away from the angle of reflection that the surface absorbs the light. In other words, the surface appears relatively dark.

Figure 5:
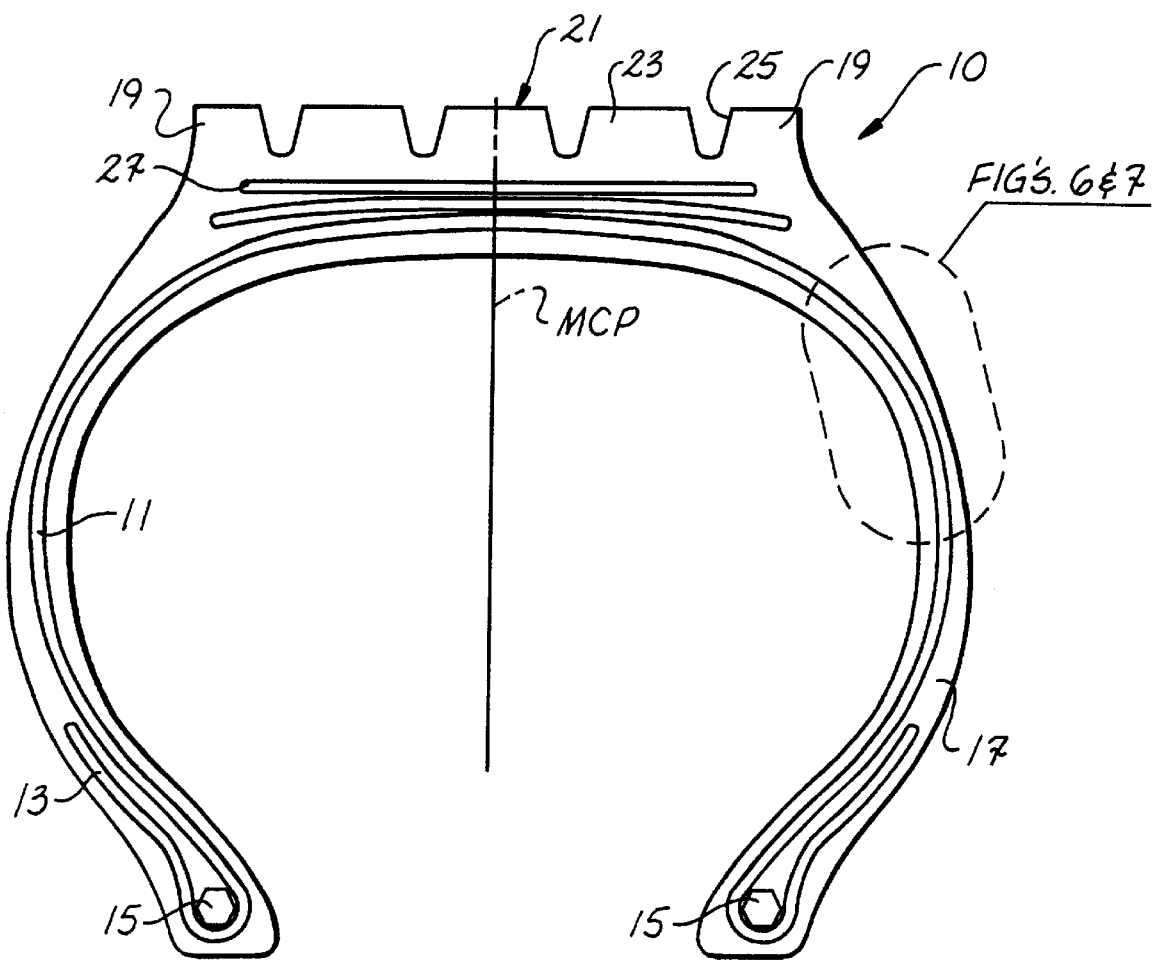
FIG. 5 is a cross-sectional view of a tire exhibiting indicia of the present invention.

As stated above, the preferred platform for the present invention is a tire. FIG. 5 displays the typical components of a tire 10. Briefly, tire 10 includes at least one carcass ply 11 having ends 13 anchored to inextensible annular bead members 15 on opposite side of a midcircumferential plane MCP. Bead members 15 securely mount tire 10 to a wheel rim. Bead members 15 can have any desired cross-sectional shape. Tire 10 includes sidewalls 17 extending between a bead members 15 and a shoulder region 19. Shoulder regions 19 may include a decoupling groove (not shown).

A tread portion 21 joins sidewalls 17. Tread portion 21 contacts the ground during rolling movement of tire 10. Tread portion 21 may include conventional tire tread sculpture features, such as tread ribs or blocks 23, circumferential grooves 25, lateral grooves (not shown), and sipes (not shown).

At least one belt ply 27 is located between tread portion 21 and carcass ply 11. Belt ply 27 is typically made of rubber and includes embedded reinforcing cords (not shown). In commercial vehicle tires, the reinforcing cords are typically manufactured from steel.

FIGS. 1–4 demonstrate two conventional indicia arrangements on a tire 910. Since tire 910 can be identical to tire 10 save the indicia, no detailed discussion of the components of tire 910 is provided. Components of tire 910 that are described below will use the same reference character as with tire 10, except for a change in the hundreds digit. In both arrangements of indicia on tire 910, a sidewall 917 includes indicia 950 thereon.

Figure 1:
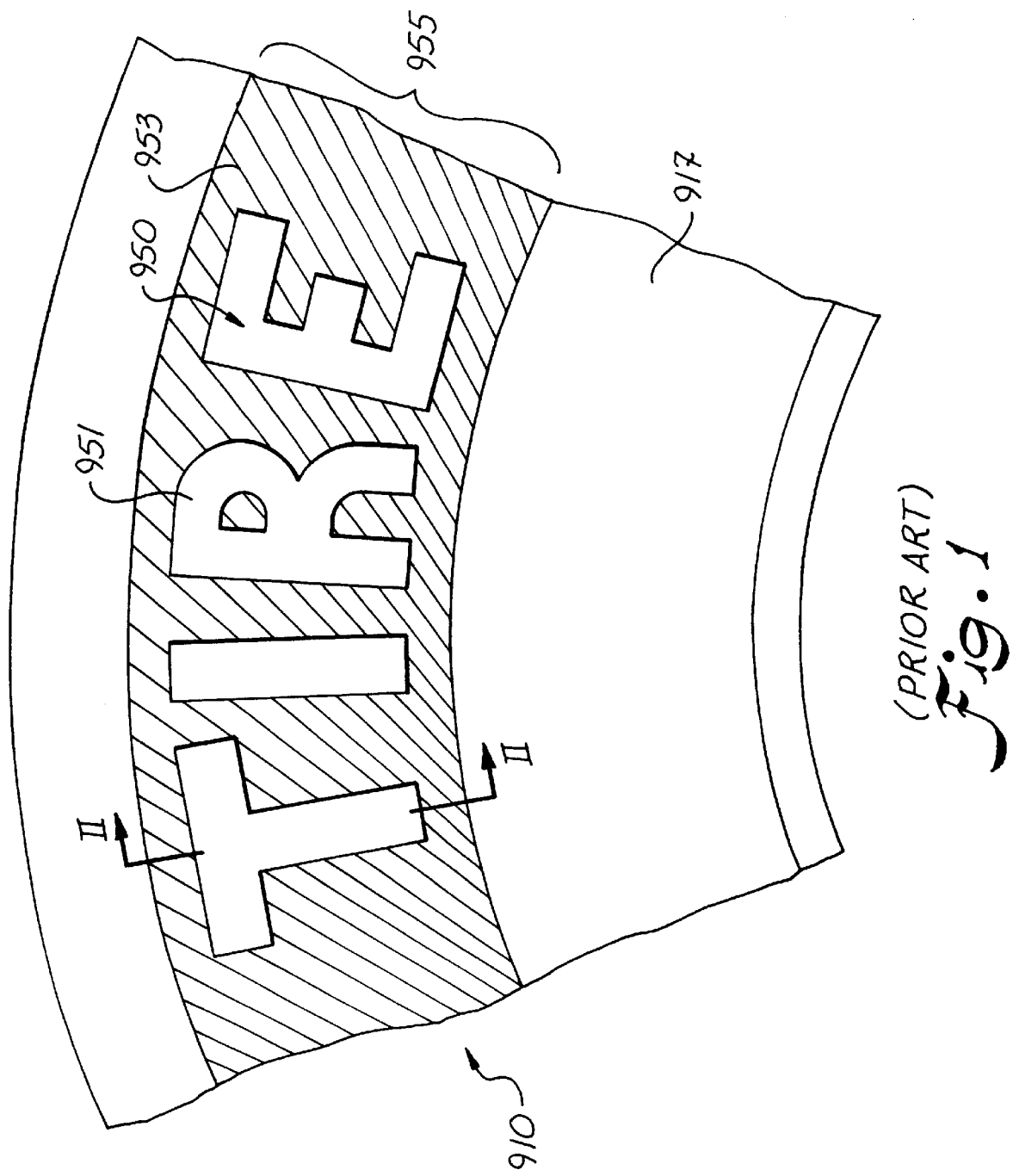
FIG. 1 is an elevational view of a portion of a sidewall of a conventional tire having indicia thereon.
Figure 2:
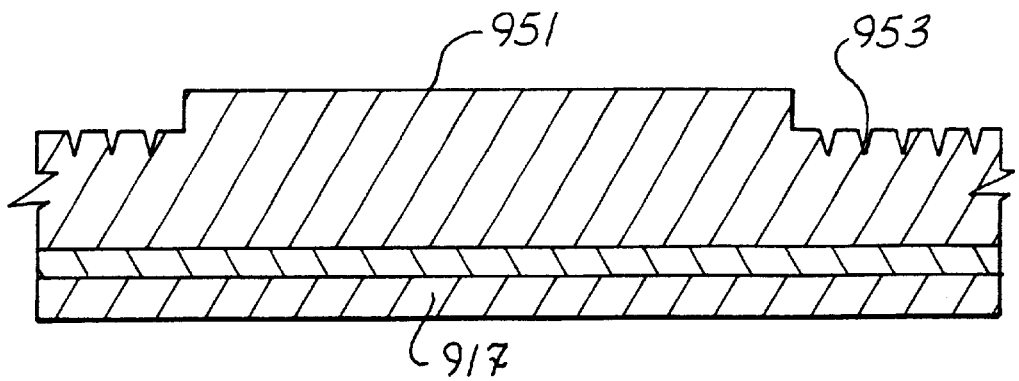
FIG. 2 is a cross-sectional view of a portion of the sidewall taken along line II—II in FIG. 1.

In the first arrangement shown in FIGS. 1 and 2, indicia 950 comprises raised portions 951 and grooves, or striae 953, located within a decorative band area 955. Striae 953 form the background in decorative band area 955. Raised portions 951 produce the letters, numbers or symbols. In FIG. 1, raised portions 951 form the word "TIRE" on sidewall 917.

As can be seen in FIG. 2, striae 953 are symmetric, triangular-shaped grooves in sidewall 917. The differences in light reflection and deflection from raised portions 951 and striae 953 enhance the visibility of indicia 951 on sidewall 917.

Figure 4:
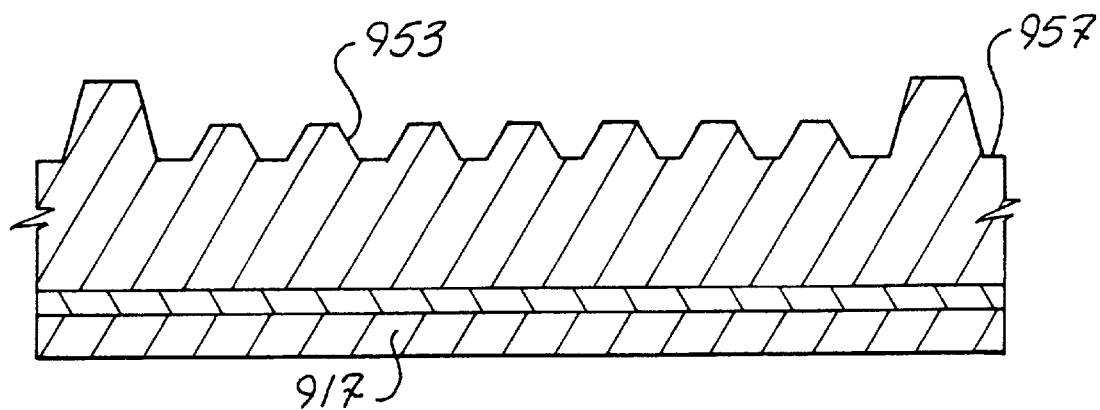
FIG. 4 is a cross-sectional view of a portion of the sidewall taken along line IV—IV in FIG. 3.
Figure 3:
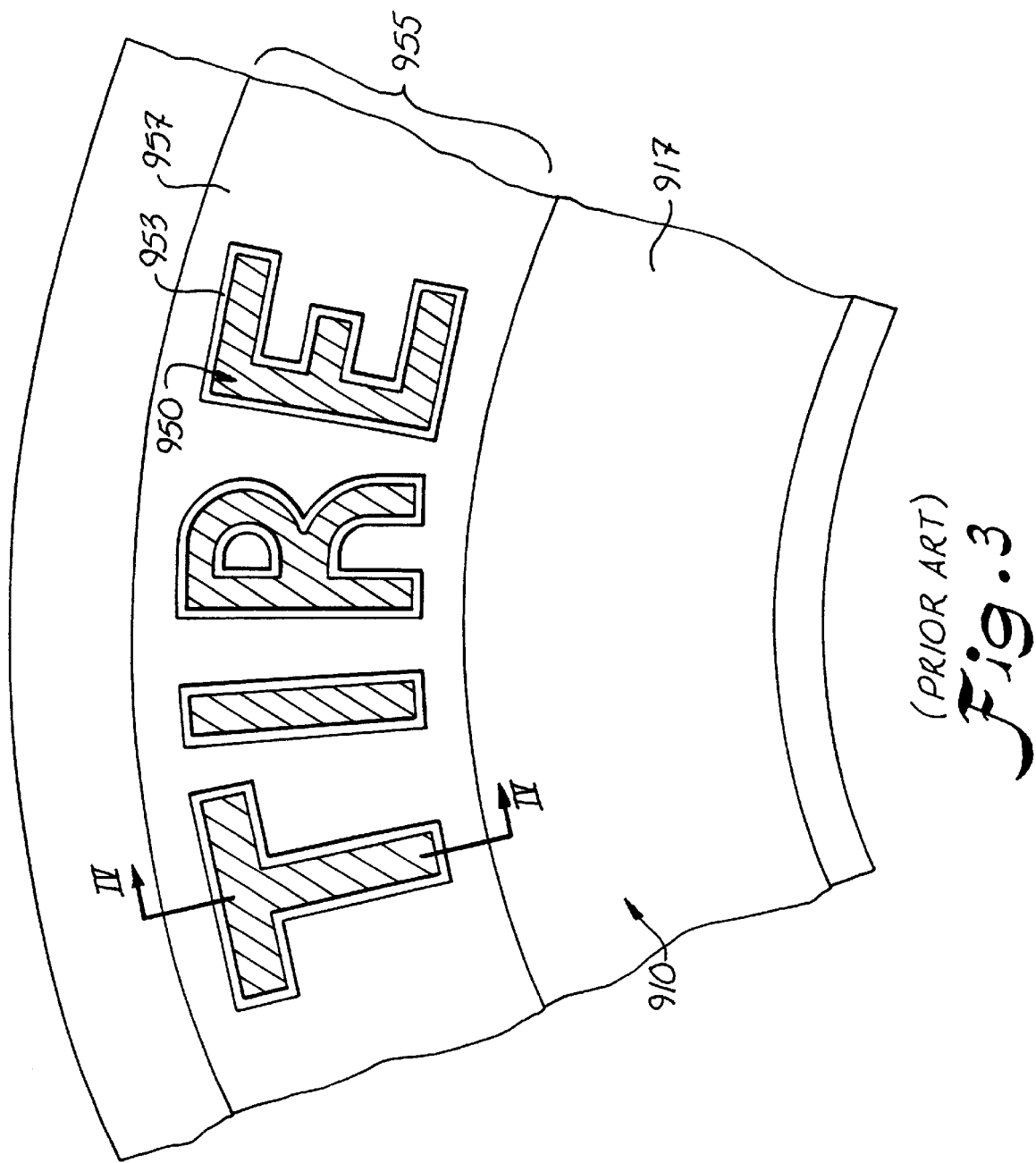
FIG. 3 is an elevational view of a portion of a sidewall of another conventional tire having indicia thereon.

In the second arrangement shown in FIGS. 3 and 4, indicia 950 comprises striae 953 and a smooth portion 957 in decorative band area 955. Smooth portion 957 forms the background in decorative band area 955. Striae 953 produce the letters, numbers or symbols. In FIG. 3, striae 953 form the word "TIRE" on sidewall 917. The differences in light reflection and deflection from smooth portion 957 and striae 953 enhance the visibility of indicia 951 on sidewall 917.

FIGS. 6–10 display two possible orientations of a first alternative embodiment of the present invention. The two possible orientations are virtually identical, save the use of a border in the orientation shown in FIGS. 6–8, and the lack of the border in the orientation shown in FIGS. 9 and 10.

Figure 6:
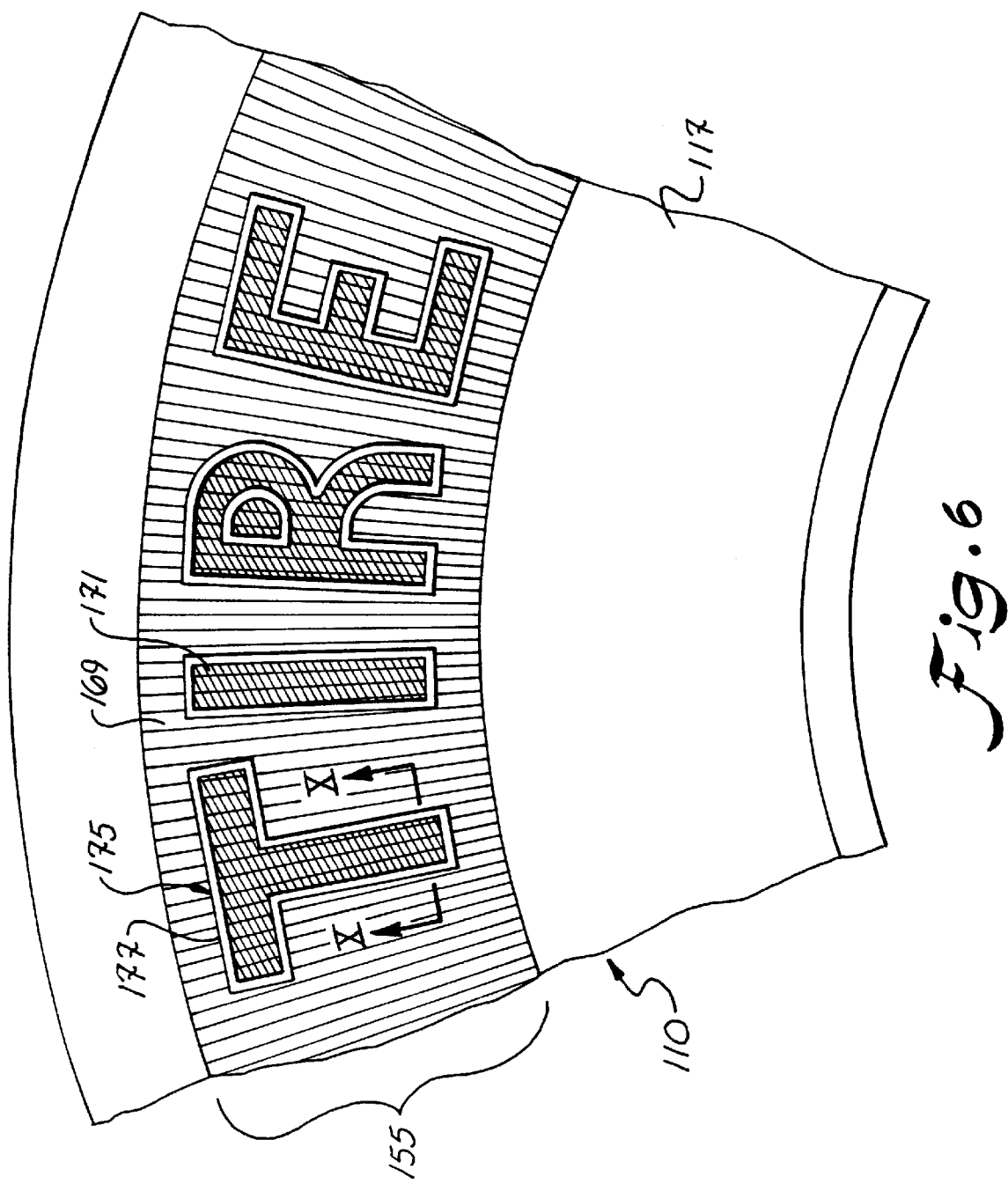
FIG. 6 is an elevational view of a first alternative embodiment of the present invention in use on a sidewall of the tire appearing within the dotted line shown in FIG. 5.
Figure 7:
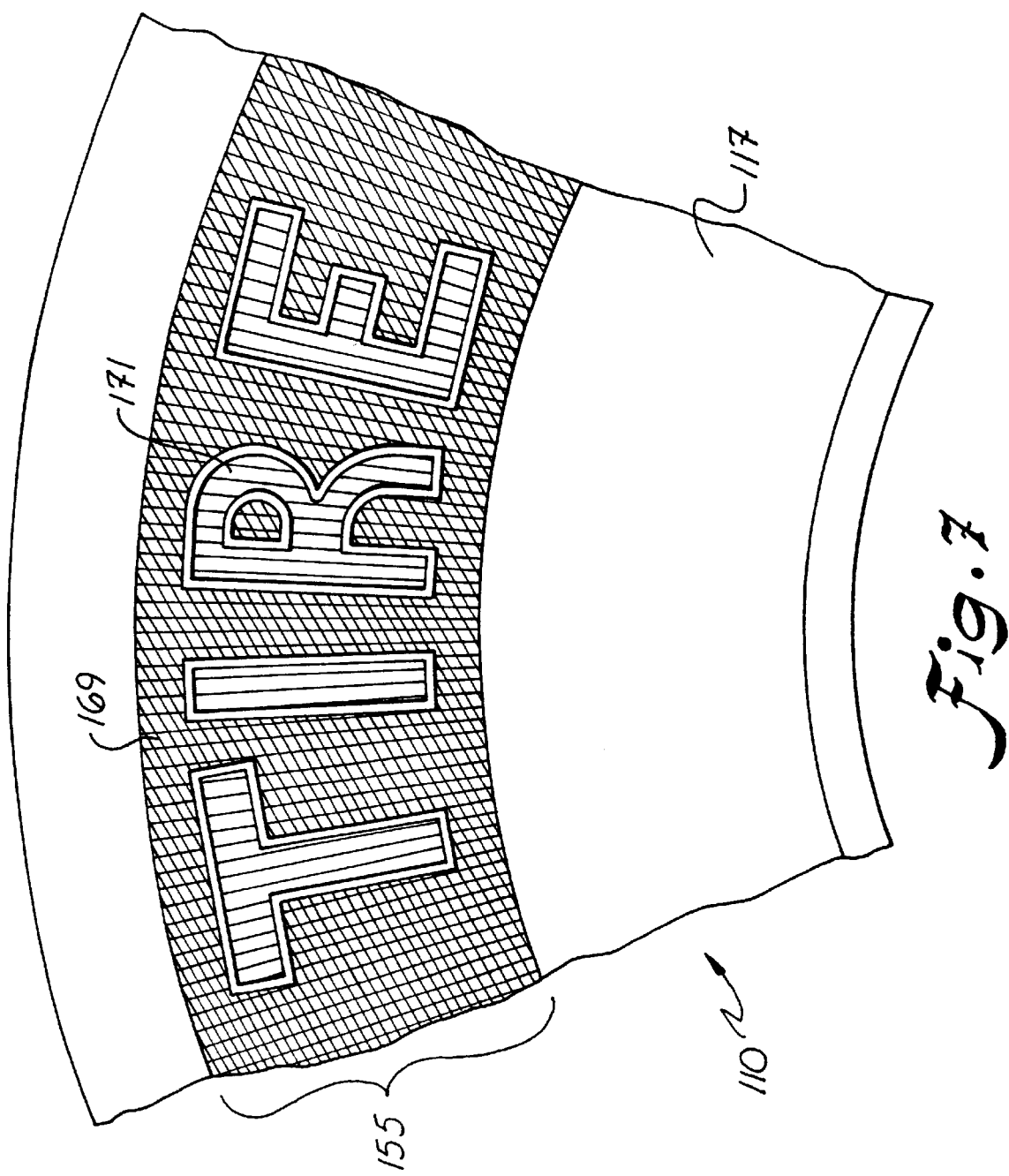
FIG. 7 is the same elevational view of the first alternative embodiment of the present invention as shown in FIG. 6, except the position of the light source has been changed.
Figure 8:
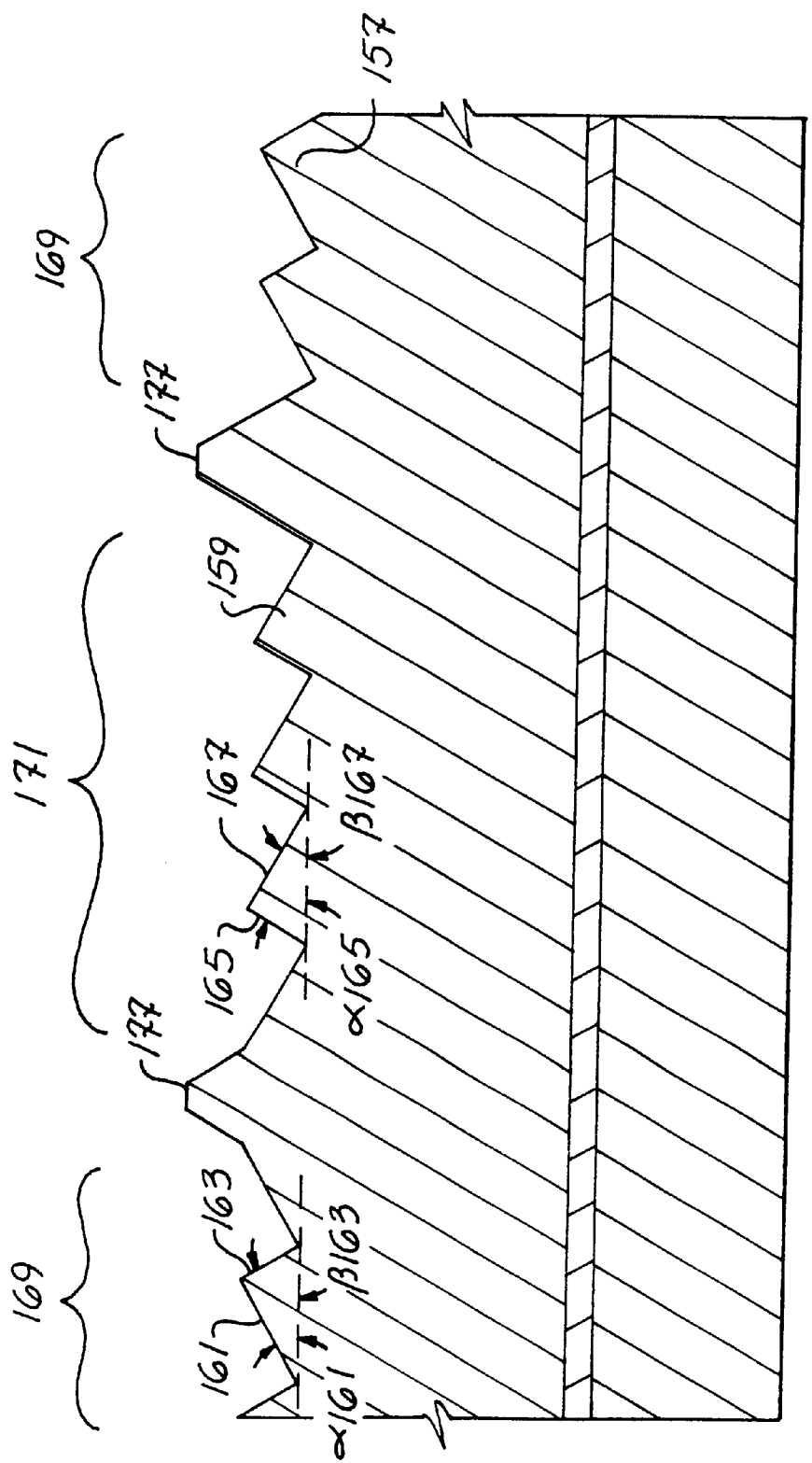
FIG. 8 is a cross-sectional view of the first alternative embodiment of the present invention taken along line VIII—VIII in FIG. 6.

FIGS. 6–8 exhibit the first orientation of the present invention on a tire 110. The present invention can be situated on any suitable surface 155 on tire 110. Surface 155 can be, for example, a sidewall (see, e.g. FIG. 6), a tread rib or block (see, e.g. FIG. 11), or a stone ejector (see, e.g. FIG. 12).

Surface 155 includes a plurality of aligned, asymmetric striae 157, 159 thereon. The striae of the present invention, aside from the limitations discussed below, can have any cross-sectional shape. For manufacturing convenience, the striae are preferably triangular in cross-section. Additionally due to manufacturing concerns, the striae may not have a "perfect" cross-section. For instance, the striae may have rounded corners (i.e. where adjacent edges merge) or may have another type of transition between adjacent edges.

Striae 157 occupy a first area 169 on surface 155. Striae 159 occupy a second area 171 on surface 155. As seen in FIGS. 6 and 7, striae 157, 159 are radially aligned. That is, each striae 157, 159 extend along a respective line passing through the center of rotation of the tire. Applicant recognizes other ways of aligning the striae. For example, FIG. 12 demonstrates parallel striae and FIG. 15 demonstrates concentrically aligned striae. Surface 155, as with any other alternative embodiment of the present invention, could accommodate any arrangement of aligned striae.

The specific depth and width of striae 157, 159 (when viewed in cross-section) are not critical to the present invention. As an example, striae 157, 159 could have a depth of approximately 0.25 mm and a width of approximately 2.5 mm, resulting in an aspect ratio of 10:1. Regardless of the actual values of striae depth and striae width, striae 157, 159 should maintain a suitable aspect ratio in cross-section. An aspect ratio of between approximately 20:1 (striae width: striae height) and 1:1 is preferred. An aspect ratio of between approximately 10:1 and 2:1 is more preferred. Finally, an aspect ratio of between approximately 6:1 and 3:1 is most preferred.

Striae 157 each include a first surface 161 that extends from surface 155 at an angle $\alpha_{161}$ and a second surface 163 that extends from surface 155 at an angle $\beta_{163}$. Striae 159 each include a first surface 165 that extends from surface 155 at an angle $\alpha_{165}$ and a second surface 167 that extends from surface 155 at an angle $\beta_{167}$. As seen in FIG. 8, striae 157 and striae 159 are oppositely oriented, that is, the first surfaces of striae 157 and striae 159 are angled in opposite directions. Stated differently, striae 157 and striae 159 are reversely arranged. Striae 157, 159 could be mirror images of each other. The opposite orientation of striae 157 and striae 159 cause the light to reflect and/or deflect from surfaces 161, 163, 165, 167 differently throughout most illumination and viewing angles.

As stated above, striae 157, 159 are asymmetric. The first surface 161 and second surface 167 are wider than second surface 163 and first surface 165, as may be seen in FIG. 8. In addition, with the preferred triangular cross-section striae, angle $\alpha_{161}$ does not equal angle $\beta_{163}$ ($\alpha_{161} \neq \beta_{163}$) on striae 157 and angle $\alpha_{165}$ does not equal angle $\beta_{167}$ ($\alpha_{165} \neq \beta_{167}$) on striae 159. The greatest contrast between striae 157 and 159 occurs when one of the surfaces of striae 157, 159 extend from surface 155 at an angle of between approximately sixty and ninety degrees (60–90°). More preferably, one of the surfaces of striae 157, 159 should extend from surface 155 at an angle of between approximately eighty and ninety degrees (80–90°). Most preferably, one of the surfaces of striae 157, 159 should extend substantially perpendicular from surface 155 (i.e. $\alpha_{165} \approx \beta_{163} 90°$ or $\alpha_{161} \approx \beta 90°$). Angles $\alpha_{161}$, $\beta_{163}$, $\alpha_{165}$, $\beta_{167}$ of greater than approximately ninety degrees (90°) are not desired with the present invention. Angles greater than approximately ninety degrees (90°) result in an "undercut" situation, which is undesirable from a manufacturing point of view.

The above discusses the preferred angles for one of the surfaces of striae 157, 159 that extend from surface 155. The angle at which the opposite surface of striae 157, 159 extends from surface 155 is determined by the aspect ratio of the striae. For instance, with a striae having an aspect ratio of 3:1 and the first surface of the striae extending perpendicular from the surface, the other surface of the striae would extend from the surface at an angle of approximately 18°.

As seen in FIG. 6, any striae extending the entire length of 155 can either maintain the same cross-section (e.g. striae 159 located between the letters "T" and "I"), or can switch between one orientation (e.g. a striae 157) and the other orientation (e.g. a striae 159) at least once (e.g. a striae passing through the letter "R"). A transition area 175 occurs where a striae changes from striae 157 to striae 159 or vice versa (see FIG. 8). Transition area 175 is, thus, an area of discrete change in cross-section of the striae.

The difference between the two alternative orientations of the first alternative embodiment reside in transition area 175. In the first alternative orientation shown in FIGS. 6–8, transition area 175 comprises a border 177. Preferably, border 177 extends from surface 155 at the same height as, or higher than, striae 157, 159. Border 177 defines the boundary between first area 169 and second area 171.

Border 177 also enhances the contrast between first and second area 169, 171. FIGS. 6 and 7 demonstrate the contrast between first area 169 and second area 171 at two different illumination angles. In FIG. 6, first area 169 reflects more light than second area 171. As a result, first area 169 appears brighter than second area 171. Second area 171 deflects more light than first area 169 and appears darker than first area 169.

FIG. 7 maintains the identical viewing angle as in FIG. 6, but changes the illumination angle. In FIG. 7, second area 171 reflects more light than first area 169. As a result, second area 171 appears brighter than first area 169. First area 169 deflects more light than second area 171 and appears darker than second area 171. The contrast between first area 169 and second area 171 also occurs when the illumination angle remains relatively constant, while the viewing angle changes.

In order to capitalize on the strong contrast between first area 169 and second area 171, one of the areas 169, 171 should be in the shape of any desired number, letter of symbol. The other surface should be the background. As seen in FIGS. 6 and 7, first area 169 is the background while second area 171 is in the shape of the word "TIRE." Thus, an observer walking past tire 110 will clearly discern the letters in second area 171 on sidewall 117 at most viewing angles.

Figure 9:
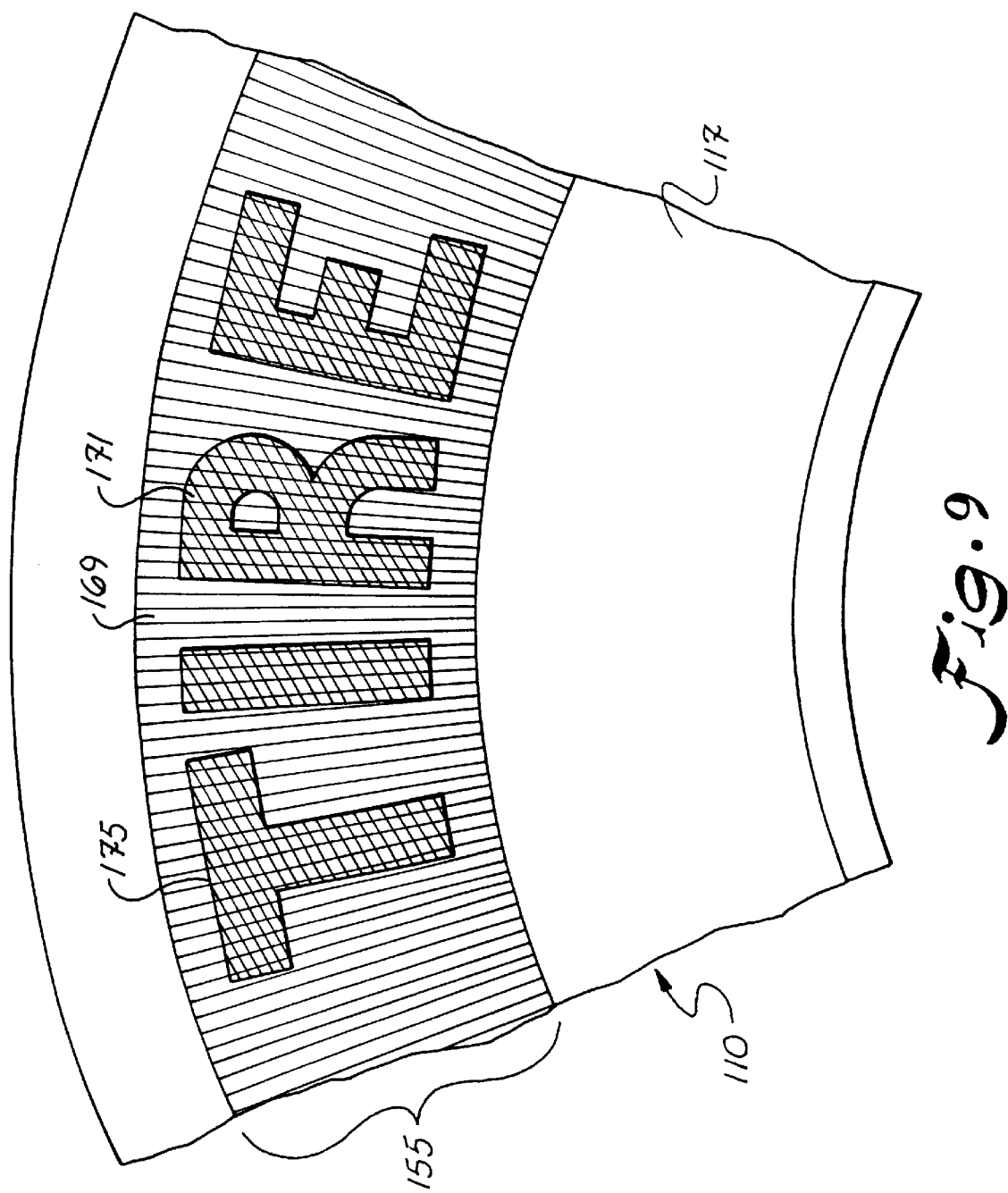
FIG. 9 is a side, or elevational, view of an alternative arrangement of the first alternative embodiment of the present invention on the tire sidewall.
Figure 10:
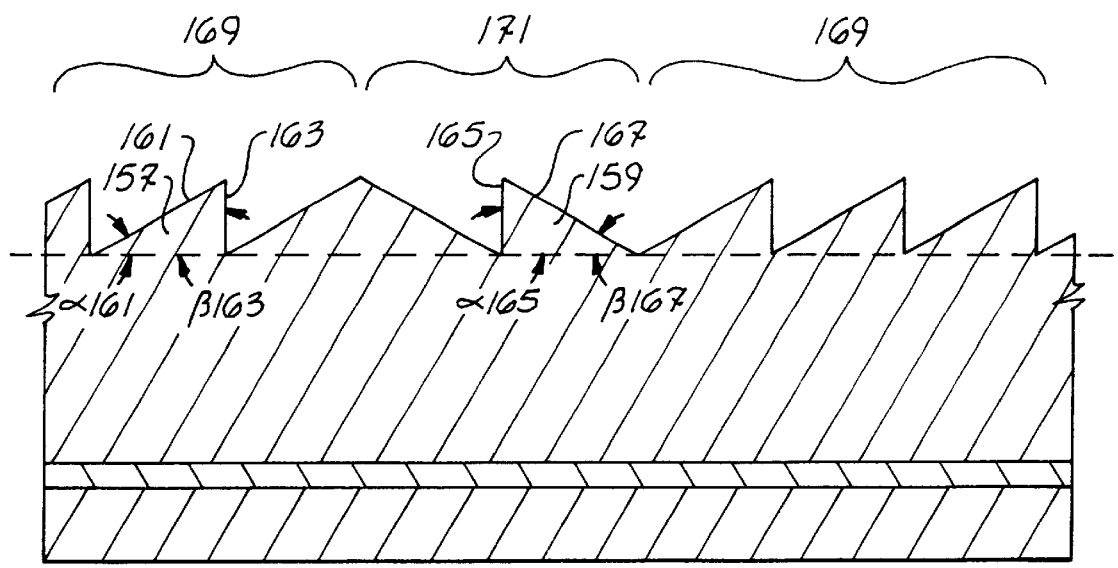
FIG. 10 is a cross-sectional view of the alternative embodiment of the present invention shown in FIG. 9 taken along line X—X.

Transition area 175 in the second alternative orientation shown in FIGS. 9 and 10 lacks the border of the first alternative orientation. Transition area 175 in this alternative orientation is merely the discrete change in cross-section between striae 157 of first area 169 and striae 159 of second area 171.

Figure 11:
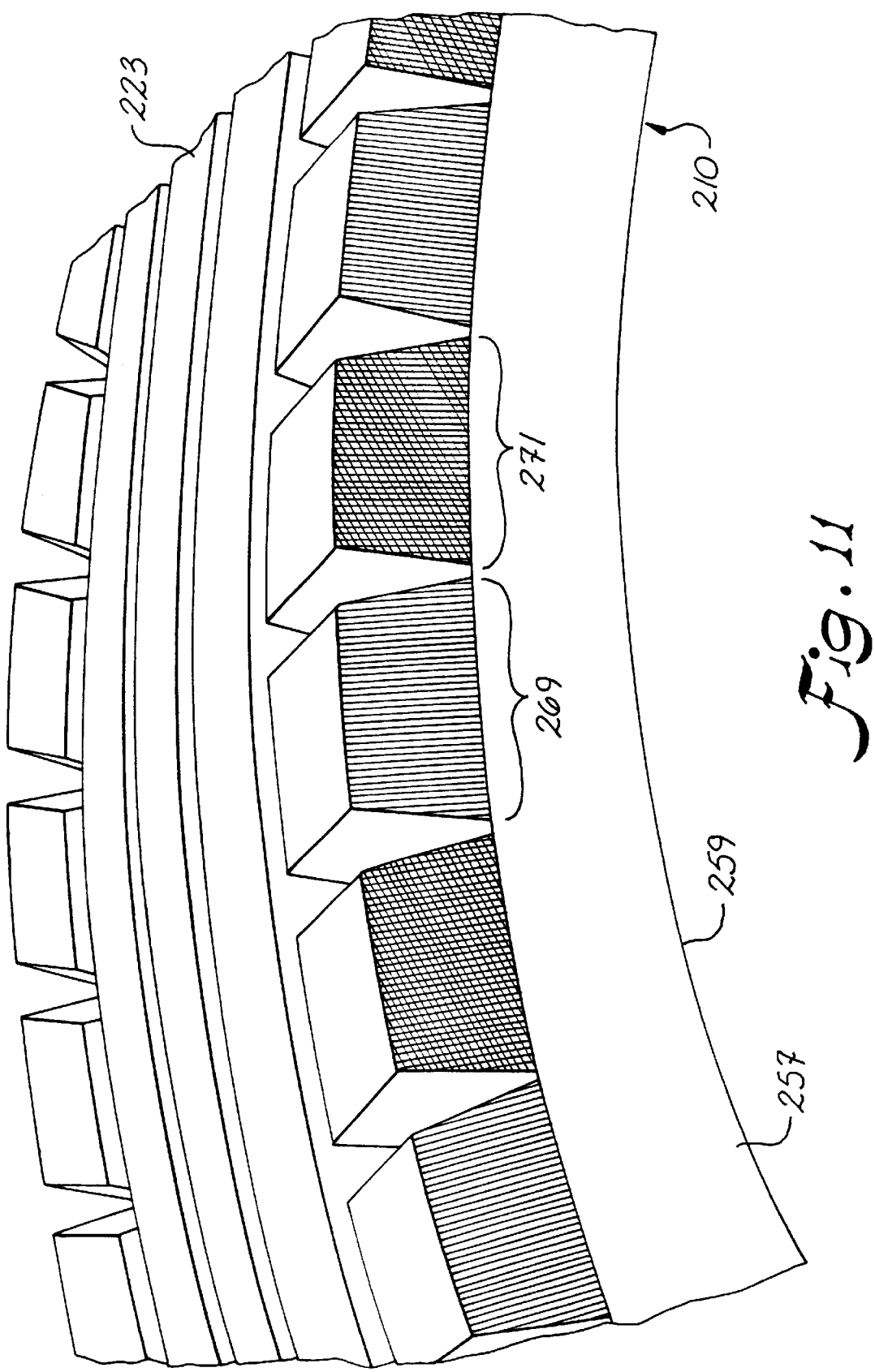
FIG. 11 is an elevational view of a second alternative embodiment of the present invention in use on a lateral surface of a tread rib or block of a tire.

FIG. 11 illustrates a second alternative embodiment of the present invention on tire 210. Features similar to the features described above in the first embodiment will use the same reference character, except for a change in the hundred digit.

Tire 210 includes striae 257 in a first area 269 and oppositely oriented striae 259 in a second area 271. Striae 257, 259 are located on tread ribs or blocks 223. Although striae 257, 259 can reside at any suitable location on any tread rib or block 223, preferably striae 257, 259 reside on the outwardly facing side surfaces of the laterally outermost tread rib or block 223 on each side of tire 210. The laterally outermost tread rib or block 223 could be a decoupling rib (not shown). Striae 257, 259 preferably possess the same geometric properties (aspect ratio, angles, etc.) as striae 157, 159 of the first embodiment. Thus, further discussion of these properties is unnecessary.

Striae 257, 259 preferably occupy alternating tread blocks 223. Striae 257, 259 within each tread block 223 can be aligned in any suitable fashion. FIG. 11 shows that striae 257, 259 residing within a given tread block have a parallel relationship. The central striae in each tread block 223 extends in a radial direction from the center of the tire. An optical contrast exists between adjacent tread blocks 223 due to the presence of alternating striae 257, 259 on the adjacent tread blocks 223. When comparing adjacent tread blocks 223, one tread block 223 reflects more light than an adjacent tread block 223 at a given viewing angle and illumination angle. As a result, one tread block 223 appears brighter than its adjacent tread blocks 223.

The contrasting tread blocks 223 provide the impression that the tire has a higher traction, more aggressive tire tread. Although tread blocks 223 in FIG. 11 have the same lateral extent (i.e. no tread block 223 extends laterally outward further than any of the other tread blocks 223), the contrast between adjacent tread blocks 223 makes the tread blocks appear laterally offset. By using tread blocks 223 with the same lateral extent, tire 210 may exhibit more uniform wear than a similar tire having inset/outset tread blocks.

When either the viewing angle or the illumination angle is changed, the opposite contrast will occur. The one tread block 223, once brighter, now appears darker than its adjacent tread blocks 223. The adjacent tread block 223, once darker, is now brighter than its adjacent tread blocks 223. This feature maintains the appearance of higher traction, more aggressive tire treads.

Figure 12:
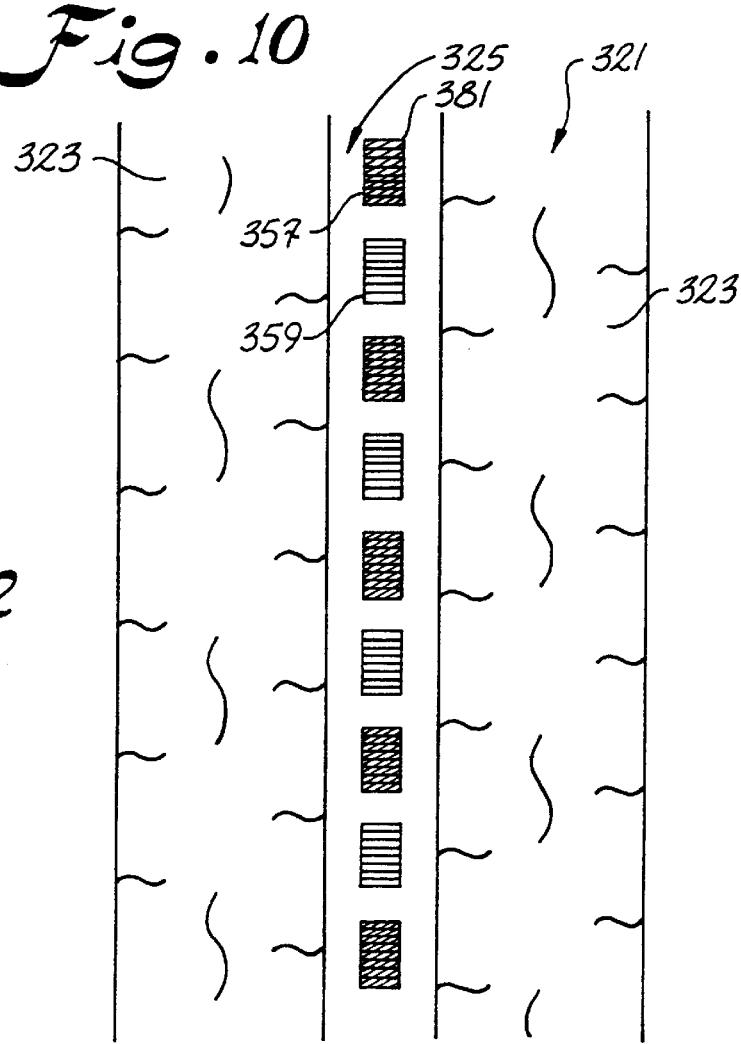
FIG. 12 is a plan view of a third alternative embodiment of the present invention in use on an upper surface of a stone ejector of a tire.
Figure 13:
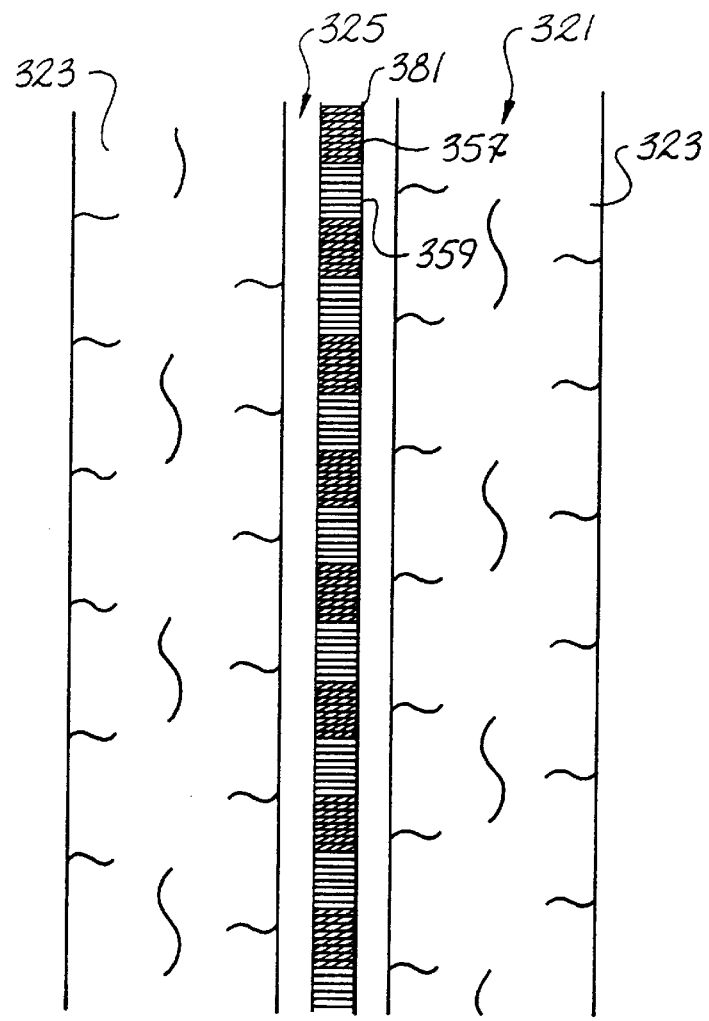
FIG. 13 is a plan view of the third alternative embodiment of the present invention on an alternative arrangement of the stone ejector of a tire.

FIGS. 12 and 13 illustrate a third alternative embodiment of the present invention on tire 310. Features similar to the features described above in the earlier embodiments will use the same reference character, except for a change in the hundred digit.

In this embodiment, striae 357, 359 are located on stone ejectors 381 located within circumferential groove 325 positioned between adjacent tread ribs or blocks 323. Preferably, striae 357, 359 reside on the upper surface of stone ejectors 381. As with the other alternative embodiments, striae 357, 359 are aligned in any suitable manner. In the orientation shown in FIGS. 12 and 13, striae 357, 359 are parallel. Striae 357, 359 preferably possess the same geometric properties (aspect ratio, angles, etc.) as striae 157, 159 of the first embodiment. Thus, further discussion of these properties is unnecessary.

FIG. 12 demonstrates separate stone ejectors 381 positioned circumferentially along groove 325. With such an arrangement, striae 357 reside on one stone ejector 381 and striae 359 reside on adjacent stone ejectors 381. An optical contrast exists between adjacent stone ejectors 381 due to the presence of striae 357, striae 359 on alternating stone ejectors. When comparing adjacent stone ejectors 381, one stone ejector 381 reflects more light than the adjacent stone ejector 381 at a given viewing angle and illumination angle. As a result, the one stone ejector 381 appears brighter than the adjacent stone ejector 381, whereas its adjacent stone ejectors 381 appear darker at the given viewing angle and illumination angle.

If the stone ejectors 381 all have the same height, then the contrast between adjacent stone ejectors 381 caused by the presence of striae 357, 359 creates the impression that adjacent stone ejectors 381 have different heights. If the stone ejectors 381 do have different heights, then the contrast between adjacent stone ejectors 381 caused by the presence of striae 357, 359 further exaggerates the height differences between adjacent stone ejectors 381.

When either the viewing angle or the illumination angle is changed, the opposite contrast will occur. The one stone ejector 381, once brighter, now appears darker than its adjacent stone ejectors 381. The adjacent stone ejector 381, once darker, is now brighter than the one stone ejector 381. This feature maintains the appearance of varying heights of stone ejectors 381.

As seen in FIG. 13, the third alternative embodiment of the present invention could also be utilized on a continuous stone ejector 381. In this arrangement, stone ejector 381 alternates between oppositely oriented striae 357, 359 along its length. As with the earlier arrangement of the third alternative embodiment, striae 357, 359 create the appearance of a varying height of stone ejector 381.

FIGS. 14–17 illustrate fourth, fifth and sixth alternative embodiments of the present invention. Features similar to the features described above in the earlier embodiments will use the same reference character, except for a change in the hundred digit. As stated above, the present invention can be used on any opaque article. The first, second and third embodiments of the present invention were demonstrated on a specific opaque article—a tire. Each of the following embodiments will now be described with reference to a generic opaque article.

Figure 14:
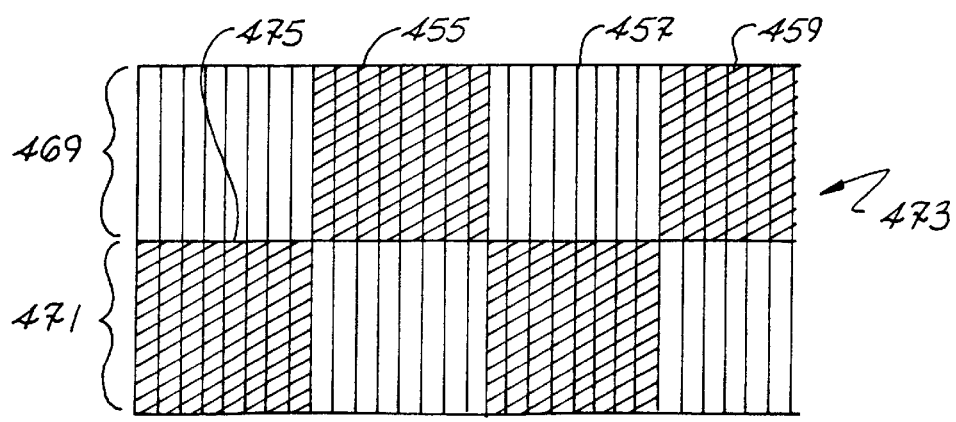
FIG. 14 is a plan view of a fourth alternative embodiment of the present invention in use on an opaque article.

FIG. 14 demonstrates the present invention on an opaque article 473. A surface 455 includes a plurality of striae 457 in a first area 469 and a plurality of striae 459 in a second area 471. Striae 457, 459 are aligned parallel. Striae 457, 459 preferably possess the same geometric properties (aspect ratio, angles, etc.) as striae 157, 159 of the first embodiment. Thus, further discussion of these properties is unnecessary.

A transition area 475 exists at a change from one striae orientation (e.g. striae 457) to the other striae orientation (e.g. striae 459) along the same striae. First and second areas 469, 471 can have any desire shaped. As seen in FIG. 14, first and second areas 469, 471 could be substantially rectangular, preferably square, to form a "checkerboard" pattern.

The pattern could also have a parallelogram shape, with a rhombus shape being preferred. FIG. 14 shows striae 457, 459 positioned normal to transition area 475. Alternatively, striae 457, 459 could be angled relative to transition area 475.

Figure 15:
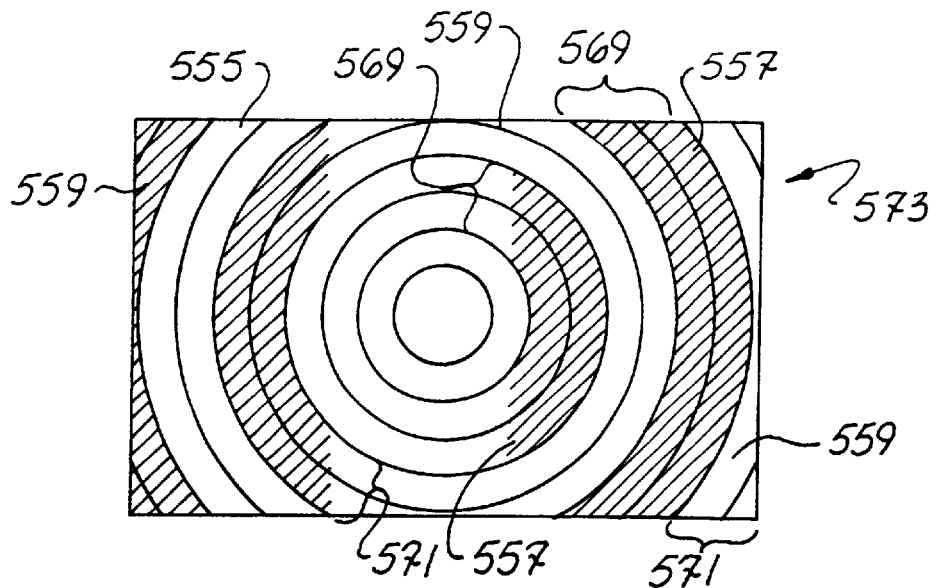
FIG. 15 is a plan view of a fifth alternative embodiment of the present invention in use on an opaque article.

FIG. 15 demonstrates a fifth alternative embodiment of the present invention. While the earlier alternative embodiments were directed to either radially aligned or parallel striae, this embodiment uses concentrically aligned striae.

Surface 555 of opaque article 573 includes a plurality of aligned striae 557, 559 thereon. Striae 557 occupy a first area 569 and oppositely oriented striae 559 occupy a second area 571. Striae 557, 559 preferably possess the same geometric properties (aspect ratio, angles, etc.) as striae 157, 159 of the first embodiment. Thus, further discussion of these properties is unnecessary.

Article 573 with striae 557, 559 thereon exhibits an optical contrast between portions of first area 569 and second area 571. At a given illumination angle and viewing angle and as seen in FIG. 15, portions of striae 557 within a semicircle of the concentrically arranged striae and opposite portions of striae 559 in the other semicircle of the concentrically arranged striae will reflect more light than the remainder of the striae 557, 559. As a result, portions of striae 557, 559 appear brighter than the other portions of striae 557, 559.

As either the illumination angle or the viewing angle changes, a different semicircle of the concentrically arranged striae will reflect more light than the remainder of striae 557, 559. In other words, portions of striae 557, 559 will always appear brighter than the other portions of striae 557, 559.

The first five alternative embodiments of the present invention displayed discrete, oppositely oriented striae. The alternative arrangement of the fifth alternative embodiment of the present invention and the sixth alternative embodiment of the present invention, while still exhibiting oppositely oriented striae, achieve the result in a manner different than the previously discussed alternative embodiments.

Figure 16:
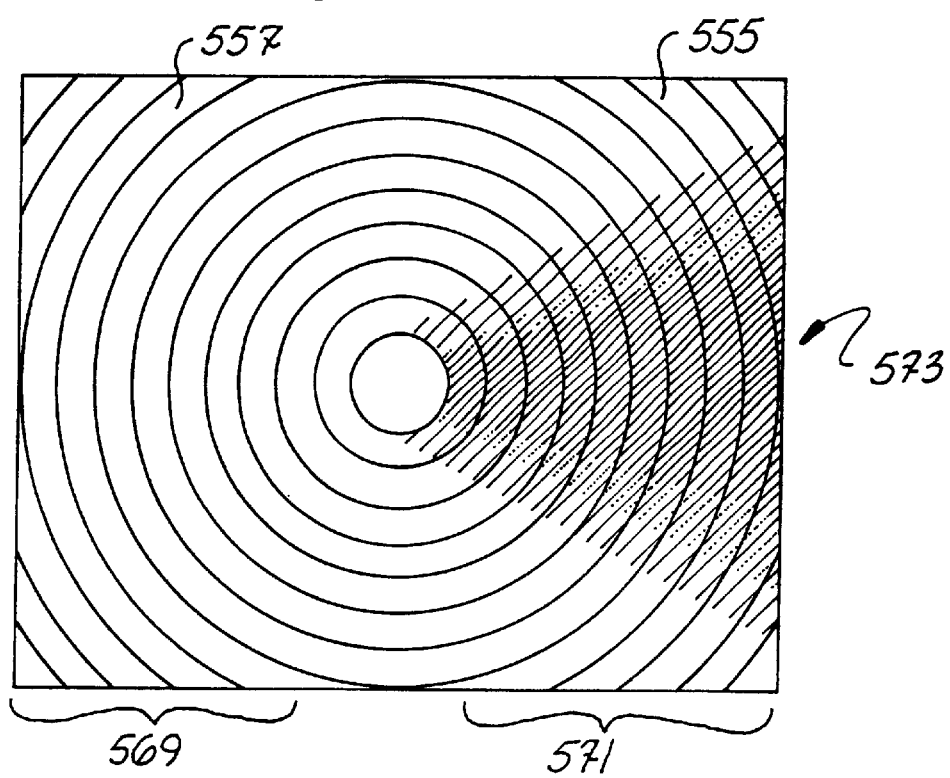
FIG. 16 is a plan view of an alternative arrangement of the fifth alternative embodiment of the present invention in use on an opaque article.

FIG. 16 displays an alternative arrangement of the embodiment of FIG. 15. In this alternative arrangement, surface 555 of opaque article 573 includes only one orientation of aligned striae 557. The use of only one orientation of striae 557 still creates the appearance of an oppositely oriented striae. Although striae 557 is continuous about its circumference, striae 557 maintains an opposite orientation at opposite sides of the circular striae 557 when viewed in cross-section.

Even with one orientation of striae 557, an optical contrast exists between one side of the concentric striae 557 (e.g. first area 569) and the opposite side of the concentric striae 557 (e.g. second area 571). At a given illumination angle and viewing angle as seen in FIG. 16, first area 569 will reflect more light than second area 571. As a result, first area 569 appears brighter than second area 571.

As either the illumination angle or the viewing angle changes, a different portion of the concentrically arranged striae will reflect more light than the other portion of striae 557. In other words, portions of striae 557 will always appear brighter than the portions of striae 557 on the opposite side of the concentric circles.

Figure 17:
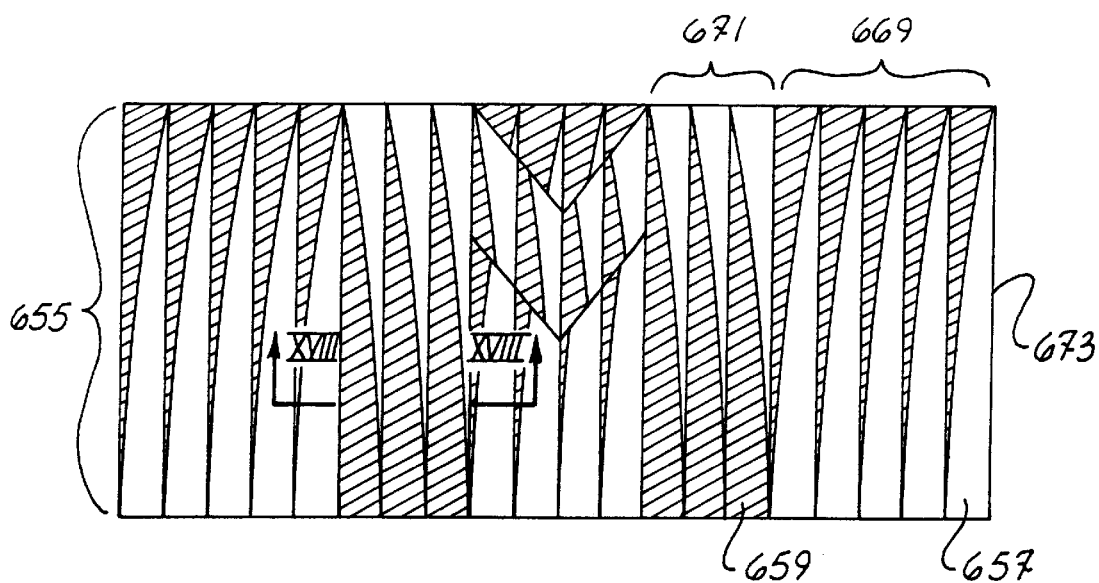
FIG. 17 is a plan view of a sixth alternative embodiment of the present invention in use on an opaque article.
Figure 18:
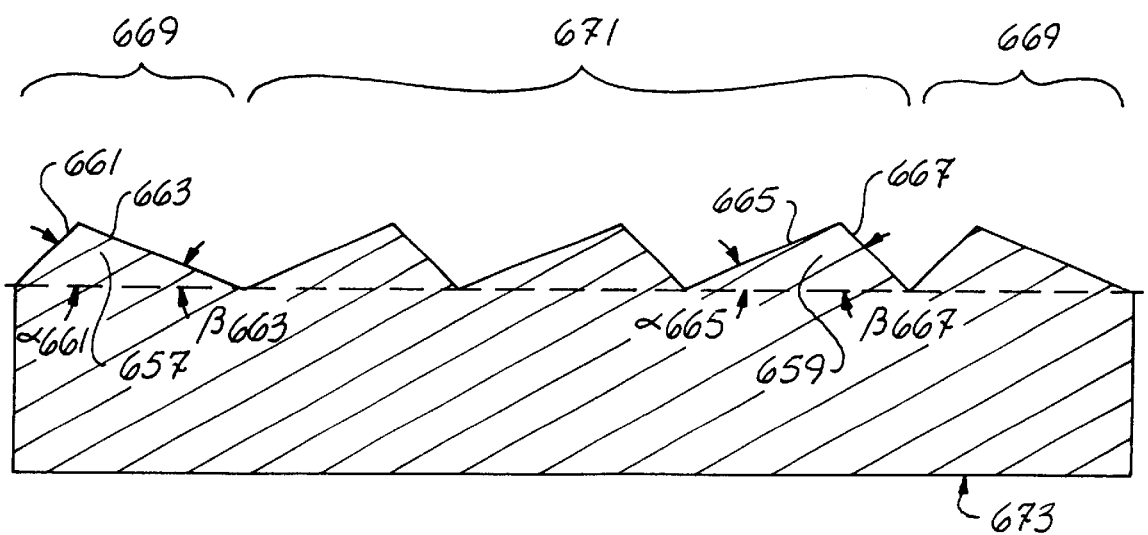
FIG. 18 is a cross-sectional view of the sixth alternative embodiment of the present invention taken along line XVIII—XVIII in FIG. 16.

FIGS. 17 and 18 illustrate a sixth alternative embodiment of the present invention on a surface 655 of an opaque article 673. Striae 657 occupy a first area 669 and striae 659 occupy a second area 671 on surface 655. FIGS. 17 and 18 demonstrate striae 657, 659 being parallel. As with the earlier embodiments, Applicant recognizes other ways of aligning the striae.

Similar to the earlier embodiments, striae 657 each include a first surface 661 that extends from surface 655 at an angle $\alpha_{661}$ and a second surface 663 that extends from surface 655 at an angle $\beta_{663}$. Striae 659 each include a first surface 665 that extends from surface 655 at an angle $a_{665}$ and a second surface 667 that extends from surface 655 at an angle $\beta_{667}$. As seen in FIG. 18, striae 657 and striae 659 are oppositely oriented. Stated differently, striae 657 and striae 659 are reversely arranged. Striae 657, 659 could be mirror images of each other. The opposite orientation of striae 657 and striae 659 reflect and/or deflect light differently throughout most illumination angle and viewing angle combinations.

Differently than in the first embodiment, striae 657, 659 of the sixth alternative embodiment have a variable cross-section along the length of surface 655. FIG. 17 demonstrates that the cross-sectional shape of striae 657, 659 can be continuously variable. Applicant recognizes that the striae can also be discretely variable (not shown in this alternative embodiment, but the first alternative embodiment demonstrates an example of a discrete change in cross-section at transition areas 175).

In order to meet manufacturing concerns and bearing in mind the desired aspect ratio of the striae, the angles $\alpha_{661}$, $\beta_{663}$, $\alpha_{665}$ and $\beta_{667}$ could vary between the angles discussed above with reference to the striae of the first embodiment. Specifically, angles $\alpha_{661}$, $\beta_{663}$, $\alpha_{665}$ and $\beta_{667}$ could vary between a lower value of between approximately two and fifty degrees (2° to 50°) to an upper value of approximately ninety degrees (90°). Preferably, the lower value of angles $\alpha_{661}$, $\beta_{663}$, $\alpha_{665}$ and $\beta_{667}$ varies between approximately five degrees and thirty-five degrees (5° to 35°). Most preferably, the lower value of angles $\alpha_{661}$, $\beta_{663}$, $\alpha_{665}$ and $\beta_{667}$ varies between approximately eight degrees and twenty-five degrees (8° to 25°). The upper values preferably remain constant at approximately ninety degrees (90°).

FIG. 17 demonstrates that striae 657 change cross-section in phase with other striae 657; and striae 659 change cross-section in phase with other striae 659. Stated differently, FIG. 18 demonstrates that, at any point along the length of surface 655, striae 657 have the identical cross-section; and striae 659 have the identical cross-section.

Applicant recognizes that it is not essential that the striae remain in phase with the other striae. The cross-section of a striae can vary at different rates than the other striae (not shown) or can be out of phase with the other striae (not shown). These variations can provide opaque article 673 with a "grey-scale" image.

In a manner similar to the alternative arrangement of the fifth alternative embodiment of the present invention, Applicant recognizes an alternative orientation of the sixth alternative embodiment in which surface 655 has only one orientation of striae (not shown). The variation in cross-sections of the striae arranged on surface 655 create the optical contrast between different portions of the striae. At a given illumination angle and viewing angle, a portion of surface 655 of article 673 will reflect more light than another portion of surface 655 of article 673. As a result, one area of surface 655 appears brighter than another area.

The striae of the present invention can be formed on an opaque article using known techniques. In the preferred environment of tires as shown in several of the figures, the striae can be formed during the tire molding/curing step or can be formed post-cure. Forming the striae during tire molding/curing requires alteration of the tire mold. The tire mold can be altered using known techniques such as conventional machining (e.g. engraving or milling), knurling, electrical discharge machining, ultrasonic machining, laser engraving and grinding/abrasive machining. Post-cure, the tire is altered using known techniques such as laser engraving.

In opaque articles other than tires, techniques similar to those described above with respect to tires can be used. However, other known techniques can also be used. For instance, the striae can be formed by stamping (if the article, for example, is a metal sheet) and die casting.

Tables I and II below present the results of an actual experiment involving two different opaque articles—one being a conventional tire sidewall, the other being an opaque article with an arrangement of indicia thereon representing an embodiment of the present invention. Tables I and II also include a graphical display of a prophetic example of a second opaque article with an arrangement of indicia thereon representing a different embodiment of the present invention.

The experiment measured the brightness of the samples at varying illumination angles and camera angles. The prophetic example used data obtained during the actual experiments to approximate the actual conditions of a second alternative embodiment of the present invention.

Table II demonstrates the results obtained when varying the viewing angle ("VA" in Tables I and II) and maintaining a relatively constant illumination angle ("IA" in Tables I and II). Sample 1 was an opaque article having indicia thereon similar to that shown in FIG. 9. Sample 2 was an opaque article having conventional indicia thereon similar to that shown in FIG. 1. The data displayed in Table II for Samples 1 and 2 represents actual data obtained during the experiment. Sample 3 was an opaque article having indicia thereon similar to that shown in FIG. 6. The data displayed in Table II for Sample 3 represents prophetic data derived from certain values from Samples 1 and 2. Table II provides the brightness data in values which can range from zero (0) to one hundred (100).

Table I demonstrates the results obtained when varying the illumination angle ("IA" in Tables I and II) and maintaining a relatively constant viewing angle ("VA" in Tables I and II). Sample 1 was an opaque article having indicia thereon similar to that shown in FIG. 9. Sample 2 was an opaque article having conventional indicia thereon similar to that shown in FIG. 1. The data displayed in Table I for Samples 1 and 2 represents actual data obtained during the experiment. Sample 3 was an opaque article having indicia thereon similar to that shown in FIG. 6. The data displayed in Table I for Sample 3 represents prophetic data derived from certain values from Samples 1 and 2. Table I provides the brightness data in values which can range from zero (0) to one hundred (100). Tables I and II demonstrate that the present invention provides a greater contrast than conventional arrangements through most viewing angles and illumination angles.

TABLE I

|  | Trial 1 (VA = 90°) (IA = 25°) Brightness (0–100) | Trial 2 (VA = 90°) (IA = 65°) Brightness (0–100) | Trial 3 (VA = 90°) (IA = 115°) Brightness (0–100) | Trial 4 (VA = 90°) (IA = 155°) Brightness (0–100) |
|---|---|---|---|---|
| Sample 1: | | | | |
| Background | 39 | 40 | 4 | 7 |
| Lettering | 5 | 4 | 38 | 26 |
| Sample 2: | | | | |
| Background | 4 | 20 | 10 | 5 |
| Lettering | 12 | 9 | 9 | 24 |
| Sample 3: | | | | |
| Background | 39 | 40 | 4 | 7 |
| Lettering | 5 | 4 | 38 | 26 |
| Border | 12 | 9 | 9 | 24 |

TABLE II

|  | Trial 1 (VA = 25°) (IA = 45°) Brightness (0–100) | Trial 2 (VA = 45°) (IA = 45°) Brightness (0–100) | Trial 3 (VA = 90°) (IA = 45°) Brightness (0–100) | Trial 4 (VA = 155°) (IA = 45°) Brightness (0–100) | Trial 5 (VA = 25°) (IA = 45°) Brightness (0–100) |
|---|---|---|---|---|---|
| Sample 1: | | | | | |
| Background | 20 | 36 | 36 | 12 | 3 |
| Lettering | 16 | 8 | 4 | 4 | 7 |
| Sample 2: | | | | | |
| Background | 2 | 2 | 13 | 53 | 61 |
| Lettering | 3 | 4 | 5 | 13 | 18 |
| Sample 3: | | | | | |
| Background | 20 | 36 | 36 | 12 | 3 |
| Lettering | 16 | 8 | 4 | 4 | 7 |
| Border | 3 | 4 | 5 | 13 | 18 |

Applicants understand that many other variations are apparent to one of ordinary skill in the art from a reading of the above specification. Such variations are within the spirit and scope of the instant invention as defined by the following appended claims.

What is claimed is:

1. A tire having visible indicia, comprising:
    a plurality of substantially asymmetric striae extending along a surface of a sidewall of the tire, each of said striae having a first face and a second face, said faces having mutually different widths in cross section and being at mutually different angles with respect to the surface,
    a first portion of said plurality of striae residing in a first area of said surface with the respective first and second surfaces having a first orientation, and
    a second portion of said plurality of striae residing in a second area with the respective first and second surfaces having a second orientation substantially opposite said first orientation;
    wherein, said first area striae and said second area striae create an optical contrast therebetween at a plurality of viewing angles and at a plurality of illumination angles.

2. The tire according to claim 1, wherein striae of said first portion are mutually aligned in one of parallel, radial, and concentric alignment.

3. The tire according to claim 1, wherein striae of said second portion are mutually aligned in one of parallel, radial, and concentric alignment.

4. The tire according to claim 1, wherein each striae of said plurality of striae resides within only one of said first area and said second area.

5. The tire according to claim 4, wherein said each striae has a length and a constant asymmetric cross-section along said length.

6. The tire according to claim 1, wherein at least one striae resides within both said first area and said second area.

7. The tire according to claim 6, wherein said striae of said plurality of striae have a length and a variable asymmetric cross-section along said length.

8. The tire according to claim 7, wherein said plurality of striae are discretely variable in cross-section along said length.

9. The tire according to claim 7, wherein said plurality of striae are continuously variable in cross-section along said length.

10. The tire according to claim 1, wherein one of said first area and said second area has a shape in the form of at least one of a number, letter and symbol.

11. The tire according to claim 1, further comprising a transition area disposed between said first area and said second area.

12. The tire according to claim 11, wherein said transition area comprises a change in cross-section of at least one striae.

13. The tire according to claim 12, wherein said change in cross-section is discrete.

14. The tire according to claim 11, wherein said transition area comprises a border extending along said surface.

15. The tire according to claim 1, wherein said plurality of striae have an aspect ratio between approximately 20:1 and 1:1, said aspect ratio defined by a cross-sectional width of a striae and a cross-sectional depth of a striae.

16. The tire according to claim 15, wherein said aspect ratio is between approximately 10:1 and 2:1.

17. The tire according to claim 16, wherein said aspect ratio is between approximately 6:1 and 3:1.

18. The tire according to claim 1, wherein one of said first surface and said second surface of said plurality of striae extends from said surface at an angle of between approximately sixty and ninety degrees.

19. The tire according to claim 18, wherein one of said first surface and said second surface of said plurality of striae is oriented to said surface at an angle of between approximately eighty and ninety degrees.

20. The tire according to claim 19, wherein one of said first surface and said second surface of said plurality of striae is oriented substantially perpendicular to said surface.

21. The tire according to claim 1, wherein said plurality of striae each have a substantially triangular cross-section.

22. The tire according to claim 1, wherein said first area comprises a band extending around said sidewall as an annular surface.

23. The tire according to claim 22, wherein said second area resides within said band and has a shape in the form of at least one of a number, letter and symbol.

* * * * *